RF SPUTTERING METHOD AND SYSTEM

Filed June 5, 1967

3 Sheets-Sheet 1

Sept. 15, 1970 J. H. CASH, JR., ET AL 3,528,906

RF SPUTTERING METHOD AND SYSTEM

Filed June 5, 1967 3 Sheets-Sheet 2

INVENTORS
JOHN H. CASH, JR.
JAMES A. CUNNINGHAM

E. Mickey Hubbard

ATTORNEY

INVENTORS
JOHN H. CASH, JR.
JAMES A. CUNNINGHAM

E. Mickey Hubbard
ATTORNEY

United States Patent Office 3,528,906

Patented Sept. 15, 1970

3,528,906

RF SPUTTERING METHOD AND SYSTEM

John H. Cash, Jr., Richardson, and James A. Cunningham, Dallas, Tex., assignors to Texas Instruments Incorporated, Dallas, Tex., a corporation of Delaware

Filed June 5, 1967, Ser. No. 643,613

**Int. Cl. C23c *15/00***

U.S. Cl. 204—298 10 Claims

ABSTRACT OF THE DISCLOSURE

A method and system for RF sputtering thin conducting and thin insulating films on a semiconductor substrate using a first electrode for supporting a source material and an apertured second electrode. The RF voltage is applied across the first and second electrodes. The substrate is supported by a third electrode and exposed to atoms sputtered from the source which pass through the apertured second electrode. The third electrode may be at the same potential as the second electrode, or at a different potential to carry out bias sputtering. The system includes multiple pairs of first and second electrodes for multiple film deposition without breaking vacuum and a rotating third electrode which moves the substrates past the apertures in the second electrodes during sputtering to eliminate shadowing and to further enhance cooling. A shutter is provided to prevent crosscontamination of the idle sources and the film being deposited on the substrate.

This invention relates generally to the deposition of thin films, and more particularly relates to a system for radio frequency (RF) sputtering thin metallic and thin inorganic insulating materials onto the surface of semiconductor slices.

Large scale integrated circuit arrays have been under development for a number of years. These semiconductor devices have a very large number of functional circuits formed on a single slice of semiconductor material. The individual components diffused in the semiconductor slice are interconnected to form the functional circuit by one patterned metallized film. Then the circuits are interconnected by additional levels of thin film interconnections. Such an integrated circuit typically requires at least three levels of interconnections, which requires a minimum of three metal films separated by two insulating films. In practice, ten or more thin films are usually required to interconnect the circuits. In addition to the very large number of thin films required per array, the thin films must be of a quality heretofore unobtainable. The insulating films must be free of pinholes to prevent interlevel short circuits. The metal films must be free of hillocks or splatters.

RF sputtering is a well-known process by which any inorganic insulator or any metal can be deposited at relatively high rates, typically one thousand angstroms per minute. Sputtered films are relatively pinhole free and provide the highest quality attainable by presently known deposition techniques. It has been common practice in RF sputtering systems to support the semiconductor substrates on a water cooled, grounded plate at a distance of about one inch from the RF cathode carrying the bulk source of the material to be deposited as a thin film. For downward sputtering, the semiconductor slices can be held in place by gravity and thermal contact can be improved by using liquid gallium as a heat transfer mechanism between the silicon slices and the ground system.

More perfect films can be deposited by upward sputtering due to less interference from dust and other falling particles, but support of the wafer in an upward sputtering system in such a manner as to provide good cooling presents a serious problem. In a conventional approach to this problem, the wafer is supported in place by a ring threaded upwardly into the support. Or the wafer may be placed in a hole in a plate having a narrow peripheral lip at the bottom to support the wafer, and a metal disk placed on top of the slice to improve heat transfer. However, none of the upward deposition systems are entirely satisfactory. The thermal conduction away from the slices provided by the water cooled plate for holding the slices is neither adequate nor reproducible. Without good thermal contact, the large amount of heat generated by eddy currents induced in the semiconductor slice may heat the slice to such a high temperature as to damage or destroy the active components forming the circuits and previously deposited thin films.

This invention is concerned with an RF sputtering method and system for eliminating or reducing heating of the substrate while simultaneously providing a means for improving the quality of the deposited films. This is accomplished by applying an RF voltage across the source material and an apertured electrode while exposing the substrate to the atoms of the material passing through the aperture so that the atoms sputtered from the source will deposit on the substrate. As a result, a major portion of the RF energy passes between the source and the apertured electrode, and the energy passing through the substrate is greatly reduced, thereby reducing heating of the substrate. The substrate may be maintained at the same potential as the apertured electrode, or may be more positive or more negative than the apertured electrode in order to carry out a bias sputtering process to improve the quality of the deposited films by the preferential re-sputtering of certain impurities.

The present invention is also concerned with apparatus for carrying out the method which comprises a vacuum chamber, a first electrode for supporting the source material, a second apertured electrode spaced from the first electrode, a third electrode for supporting the substrates with the face to be coated exposed by the apertured second electrode to the source, and means for applying RF energy between the first and third electrodes. In accordance with a more specific aspect of the invention, the second electrode is disposed above first electrode, and the third electrode is disposed above the second electrode and is rotated to successively move a plurality of splices past the source.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figures 1, 3:
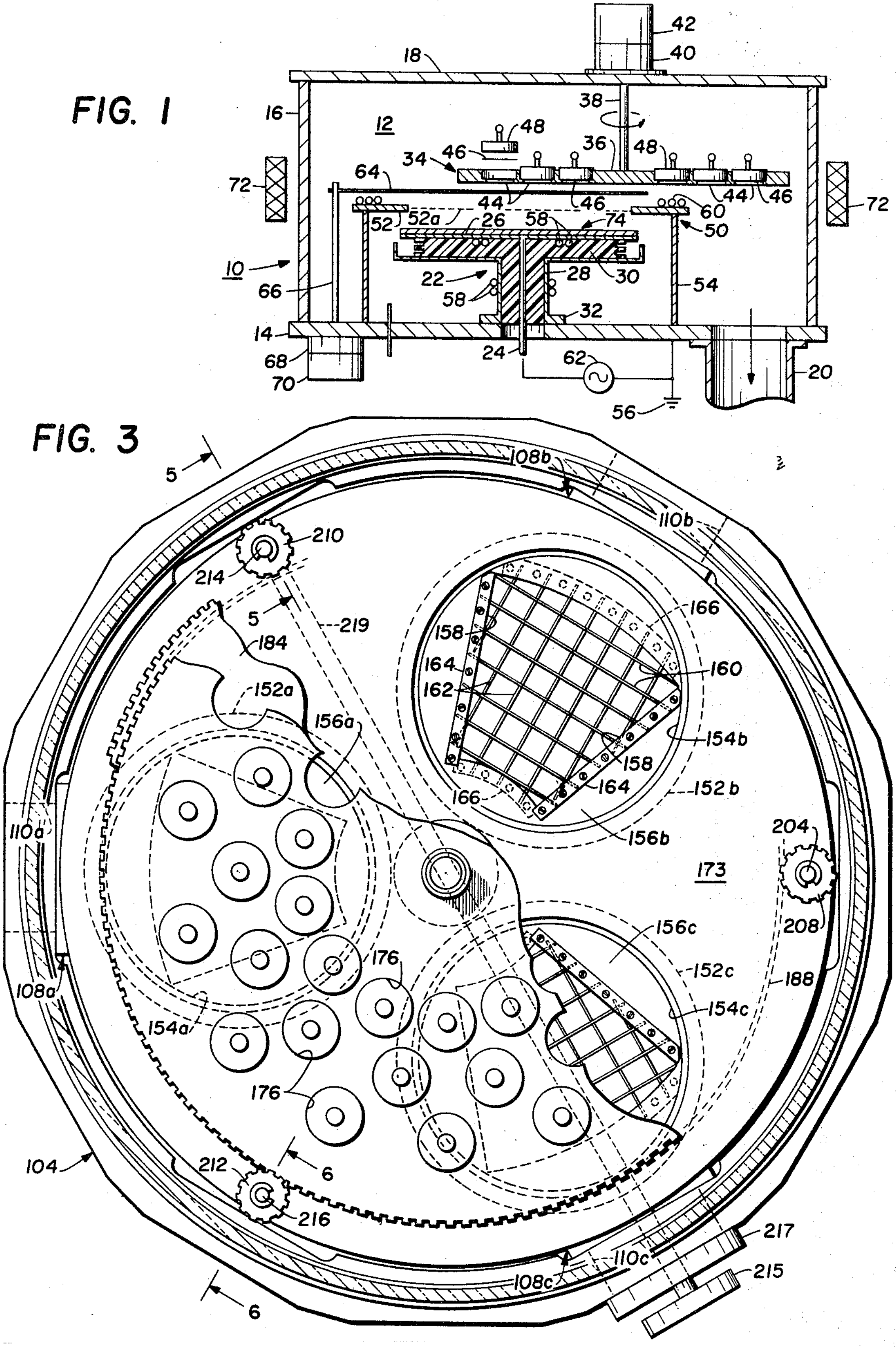
FIG. 1 is a somewhat schematic vertical sectional view of a sputtering system in accordance with the present invention.
FIG. 3 is a sectional view taken substantially on lines 3—3 of FIG. 2 with portions of the structure broken away to reveal details of construction.

Referring now to the drawings, an RF sputtering system in accordance with this invention is indicated generally by the reference numeral 10 in FIG. 1. The system 10 has a vacuum chamber 12 formed by a base plate 14, a cylindrical side wall 16, and a top plate 18. The chamber 12 is evacuated through conduit 20 by a suitable vacuum pump (not illustrated).

A first electrode assembly is indicated generally by the reference numeral 22 and is comprised of a center conductor 24 which terminates in a flat plate 26, a grounded shield 28 and a Teflon insulating body 30. The Teflon insulating body 30 provides the necessary electrical insulation and also a vacuum-tight seal between the center conductor 24 and the shield 28. The shield 28 is mounted on the base plate 14 by a flange 32 and the center conductor 24 is electrically insulated from the base plate 14.

An apertured second electrode assembly indicated generally by the reference numeral 50 is comprised of an aperturd plate 52 disposed above the first electrode assembly. The plate 52 is supported on a cylindrical wall 54 and has a central aperture covered by a wire grid 52*a*. The plate 52, including the grid portion 52*a*, is electrically connected to the base plate 14, which may be electrically grounded as represented by the symbol 56.

A third electrode assembly, indicated generally by the reference numeral 34, is formed by a round plate 36 which is attached to the lower end of a vertically disposed shaft 38 which is suspended from and journaled in a magnetic coupling 40 which is sealed to the upper plate 18. One elge of plate 36 is disposed over the aperture of the plate 52. A motor 42 rotates the plate 36 by means of the magnetic coupling 40. The plate 36 has a plurality of rows of openings 44. Each opening has a peripheral lip for supporting a slice 46 of semiconductor material or other substrates. Metal weights 48 are placed on top of the slices 46 to assist in transferring any heat that might be generated in the slices to the plate 36.

A means is provided to circulate cooling water through coils 58 disposed around the first electrode assembly 22 and through coils 60 which are in heat exchange relationship with the second electrode assembly 50. A shutter 64 is supported between the second electrode assembly 50 and the third electrode assembly 34 by a vertical shaft 66 extending from a magnetic coupling 68 and a drive motor 70. The shutter 64 may be selectively rotated into position over the aperture of electrode 50 by operation of the motor 70. A magnetic coil 72 may be disposed around the vacuum chamber to establish a vertically oriented magnetic field extending generally between the electrodes for purposes which are well known in the art.

An RF power supply 62 is connected to the center conductor 24 and to ground so that the RF voltage will be applied between the first electrode assembly 22 and the second electrode assembly 50. The third electrode assembly 34 may also be at ground potential, or may be either positive or negative with respect to the second electrode assembly 50. Or if desired, the third electrode assembly 34 may be at ground potential, and the second electrode assembly 50 may be D.C. biased either positively or negatively with respect to ground, or may be RF or A.C. biased. The RF energy may be of any desired frequency, but is usually 13.56 mHz., which is designated by the Federal Communication Commission for industrial use of this type.

In operation, body 74 of the material to be sputtered is placed on the plate 26 beneath the substrates 46 and the vacuum chamber 12 is filled with argon at a pressure of about $5\times10^{-3}$ torr. The magnetic coil 72 is energized to establish a vertically disposed magnetic field extending between the source material 74 and the substrates 46 in the conventional manner. If desired, the coil 72 can be eliminated. Then when RF energy is applied between electrode plate 26 and electrode plate 52 and the third electrode assembly, a glow discharge is established by ionization of the argon in the conventional manner. When the ionized argon atoms strike the source material 74, atoms of the source material are sputterel off and pass through the second electrode assembly and deposit on the shutter 64. After the source material has been cleaned, the motor 42 is started to rotate the plate 36 and the shutter 64 is moved aside to expose the substrates to the source material 74 through the apertured plate. The substrates being carried past the aperture in the second electrode by the third electrode is then coated with the source material. A major portion of the RF energy passes between the first and second electrodes, thus greatly reducing heating of the substrates carried by the third electrode assembly. If the third electrode assembly is biased slightly, either positively or negatively, relative to the second electrode, selective resputtering of certain impurities in the film may be made to occur so that the quality of the film is improved. Rotation of the third electrode during sputtering eliminates any shadowing which might occur from the grid 52*a* and also further cools the substrates during the period when the substrates are not over the second electrode.

Figure 2:
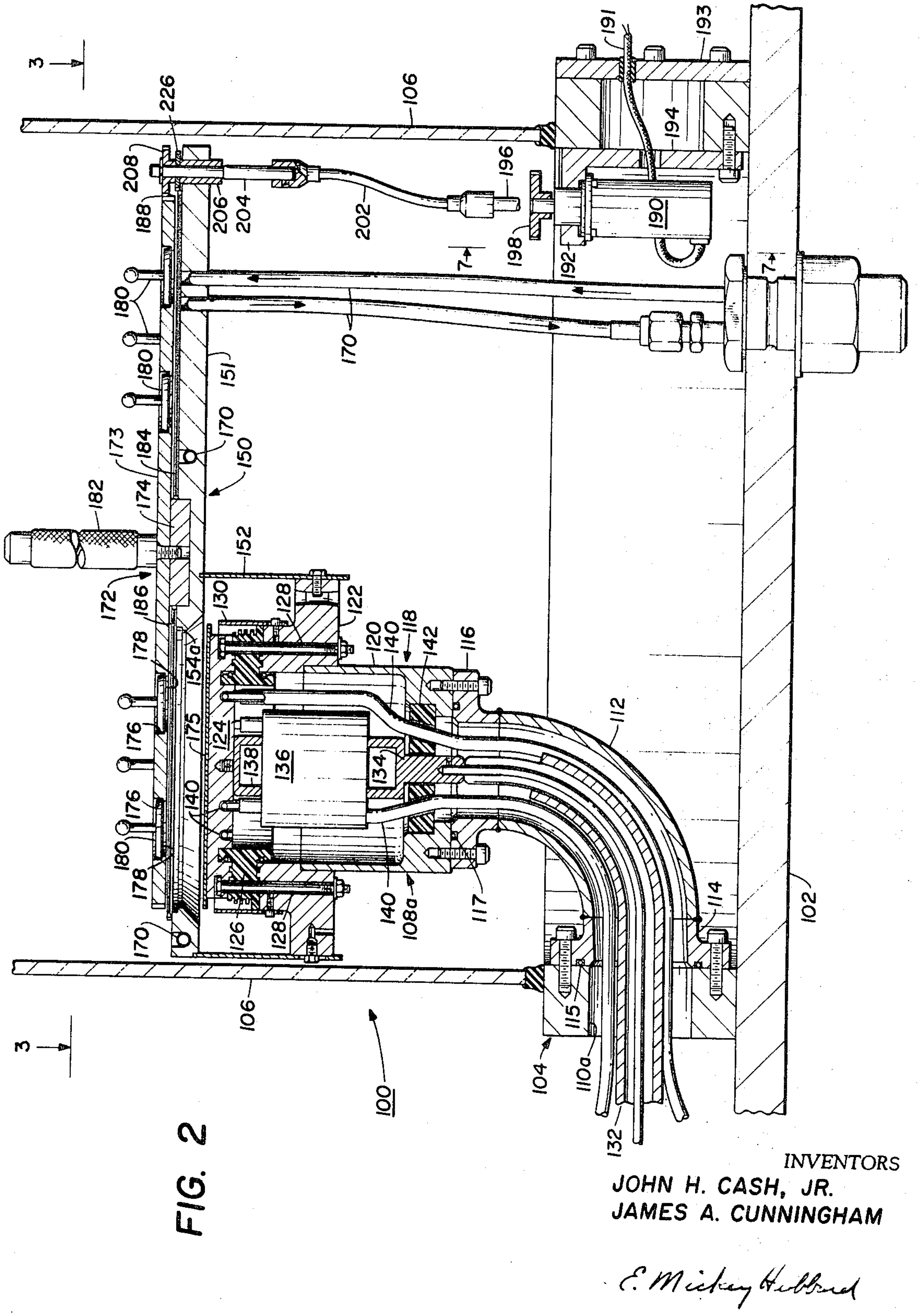
FIG. 2 is a detailed vertical sectional view of another sputtering system in accordance with the present invention.
Figure 4:
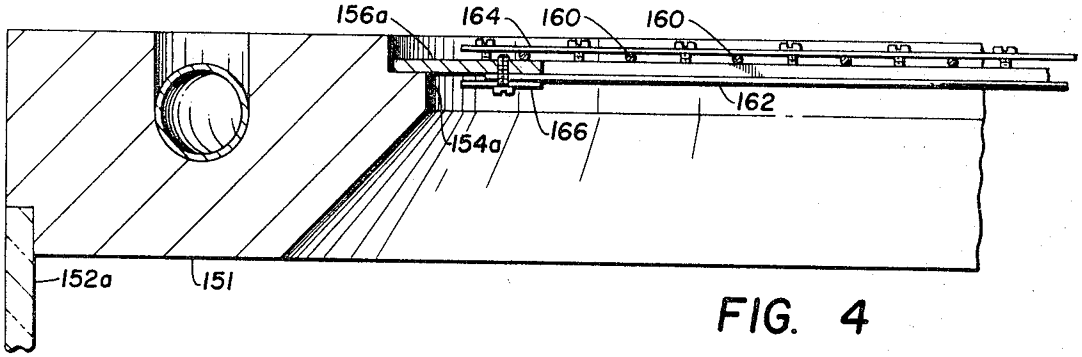
FIG. 4 is an enlarged view of a portion of the structure shown in FIG. 2 to better illustrate details of construction.

Referring now to FIGS. 2–7, another sputtering system constructed in accordance with the present invention is indicated generally by the reference numeral 100. The sputtering system 100 is formed within a conventional vacuum system comprised of a base plate 102, a feed through ring 104, and a glass bell jar 106. The upper portion of the bell jar 106 is not shown for convenience of illustration. The system 100 has three identical cathode assemblies indicated generally by the reference numerals 108*a*, 108*b*, and 108*c*, only one of which is shown in FIG. 2. The three cathode assemblies are disposed at openings 110*a*, 110*b* and 110*c*, respectively, of the feed through ring 104.

Each cathode assembly is comprised of a 90° weld L 112 and a pair of weld flanges 114 and 116. Flange 114 is connected to the feed through ring 104 and includes an O-ring seal 115 to maintain the vacuum. A capacitor housing assembly, indicated generally by the reference numeral 118, is comprised of a lower sleeve portion 120 and a flange 122 which are welded together. The sleeve 120 is bolted to flange 116, which also includes an O-ring seal 117. A cathode plate 124 is electrically isolated from the flange 122 by an insulating spacer ring 126 and is secured in place by nonconductive bolts 128. The nonconductive spacer ring 126 is sealed to the cathode plate 124 and to the flange 122 by O-rings as illustrated. A cylindrical sleeve 130 is bolted to the flange 122 and extends upwardly around the insulating ring 126 to prevent the deposition of a metal film which would short the electrode 124 to the housing 118.

RF energy is applied through coaxial conductor 132 which passes through the opening 110*a* of the feed through ring and through the weld L assembly 112. The center conductor of the coaxial cable 132 is inserted in a connector 134 of a capacitor 136 and is secured in place by a set screw. The energy is then coupled from the capacitor 136 by a connector 138 which is threaded into the cathode plate 124. A thin sheet 125 of the material to be sputtered rests on cathode plate 124.

The cathode plate 124 is cooled by water flowing through cooling coils 140 which are embedded in the plate 124. The coils 140 are made of nonconductive material and extend through an insulating spacer 142 and out through the weld L 112 to a nonconductive connector to prevent shorting of the plate 124. Thus, it will be noted that the interior of the weld L 112 and the interior of the housing assembly 118 is at atmospheric pressure. The cathode plate 124 is electrically isolated from the flange 122, the lower sleeve 120, and the weld L assembly 112, which is in electrical contact with the base plate 102 and is therefore grounded.

An apertured electrode plate, indicated generally by the reference numeral 150, is comprised of a circular plate 151 supported by the three cylindrical sleeves 152*a*, 152*b*, and 152*c* which are connected to the flanges 122 of the cathode assemblies 108*a*, 108*b*, and 108*c*, respectively. As illustrated, the sleeves 152 are electrically conductive so that the plate 151 is electrically grounded. However, if desired, the sleeves 152 may be electrically nonconductive so that the electrode plate 151 can be biased to some voltage other than ground. The plate 151 has circular openings 154*a*, 154*b* and 154*c* disposed over the cathode plates 124 of the cathode assemblies 108*a*, 108*b* and 108*c*, respectively. The openings 154*a*–154*c* have annular lips for supporting circular grid plates 156*a*–156*c*, respectively, which can best be seen in FIGS. 3 and 4. Each grid plate 156 has an aperture with edges 158 which extend radially from the center of the grid plate 150. A suitable arrangement of grid wires 160 and 162 may be disposed above and below each plate 156, and the end of the grid wires secured in place by straps 164 and 166 bolted to the plate 156. The joints between the grid wires 160 and 162 and the plate 156, and between the plate 156 and the grid plate 150 may be soldered to insure good heat transfer. The plate 151 is cooled by water circulated through cooling coils 170 which are embedded in the plate 150.

A third electrode, indicated generally by the reference numeral 172, serves as a substrate carrier. The third electrode is comprised of a plate 173 which is rotatably supported on the plate 150 by a bearing formed by a stub pinion 174 which is received in a socket formed in the plate 151. The substrate carrier plate 173 has three circumferential rows of openings 176. Each opening has an annular lip adapted to support a semiconductor slice 178 and a metal heat sink 180. The entire carrier assembly 172 may be lifted from the plate 151 by a handle 182.

A shutter disk 184 is a circular plate disposed between the carrier assembly 172 and the grid plate 150 which is free to rotate about the bearing pinion 174. The shutter disk 184 has a single circular opening 186 corresponding to the size of the openings 154*a*–154*c* so that only one of the three openings will be uncovered at any time.

Figure 7:
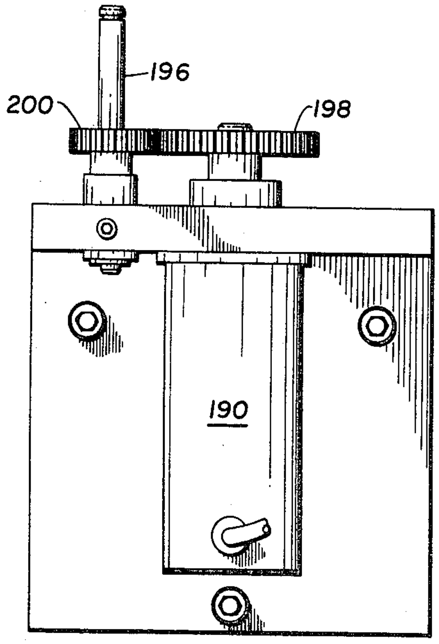
FIG. 7 is a sectional view taken substantially on lines 7—7 of FIG. 3.

The substrate carrier plate 171 has gears 188 around its entire circumference and is continuously rotated by a drive system including an electric drive motor 190 which is mounted on the inturned flange 192 of a bracket 194 bolted to the inside of the feed through ring 104. Current is supplied to motor 190 through a cable extending through a flange 193 sealed to the outside of the ring 104. The motor 190 is coupled to drive a shaft 196 through gears 198 and 200 as shown in FIG. 7. The shaft 196 is connected by flexible shaft 202 to a shaft 204 journaled in a sleeve 206 in the plate 151. A gear 208 is keyed to the upper end of the shaft 204 and meshes with the peripheral gears 188 on the substrate support assembly plate 173. Idler gears 210 and 212 also mesh with peripheral gears 188 and are rotatably journaled on shafts 214 and 216, respectively, which in turn are journaled in bearing sleeves 218 and 220 secured in plate 151, as can best be seen in FIGS. 5 and 6. As can be seen in FIG. 3, the gears 208, 210 and 212 are disposed at 120° intervals around the circumference of the substrate carrier 172.

Figure 5:
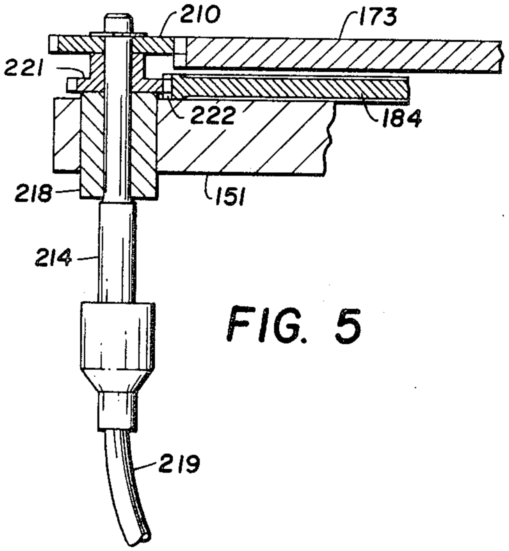
FIG. 5 is a sectional view taken substantially on lines 5—5 of FIG. 3.
Figure 6:
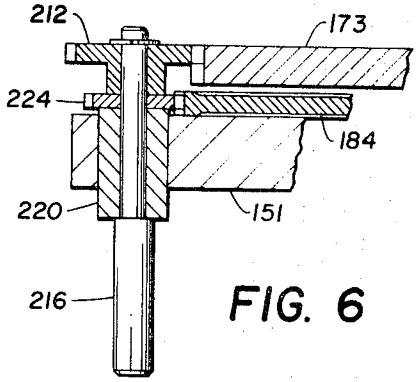
FIG. 6 is a sectional view taken substantially on lines 6—6 of FIG. 3.

The shutter 184 can be manually rotated by a knob 215 which is connected to a shaft extending through a feed through flange 217 which in turn is connected to a flexible shaft 219. The flexible shaft 219 is connected to the shaft 214 as shown in FIG. 5. A gear 221 is keyed to the shaft 214 and meshes with a circumferential set of gear teeth 222 on the shutter disk 184. Idler gears 224 and 226 are rotatably journaled on shafts 216 and 204, respectively, and also engage the peripheral gears 222.

The operation of the system 100 is basically the same as the operation of the system 10 which was heretofore described. A substantial portion of the RF energy passes between the cathode plate 124 and the grid plate 150, thus greatly reducing the amount of electrical current which would otherwise be required to pass through the bearing 174. This would likely resistively heat the bearing 174 to the point it would freeze. In addition, the plate 151 reduces heating of the semiconductor substrates by greatly reducing RF energy reaching the substrates. Since the substrates are continuously rotated, typically at a speed of about 30 r.p.m., the grid wires 160 and 162 produce no shadowing effects in the films deposited on the bottom surface of the substrates.

As the thickness of the films required decreases and the deposition rate increases, the period required for deposition decreases. As the deposition period decreases, the spacing between the grid wires 160 and 162 can be increased, and in some cases may even be eliminated because a substantial potrion of the RF energy will still pass between the cathode plate 124 and the surrounding solid portion of the apertured electrode assembly 150.

The temperature to which any one substrate 178 will ultimately reach during any given deposition period is also reduced by rotating the substrates because the substrate is exposed to the RF energy for only from one-sixth to one-eighth of the time of the deposition run, thus giving the substrate time to partially cool. The system 100 permits three different materials to be successively deposited without breaking the vacuum. The shutter 184 protects the two material sources from contamination when the sources are not being used.

Although preferred embodiments of the invention have been described in detail, it is to be understood that various changes, substitutions and alterations can be made therein without departing from the spirit and scope of the invention as defined by the appended claims.

What is claimed is:

1. The RF sputtering system for depositing a thin film of material on a substrate comprising:
- a vacuum chamber,
- a first electrode for supporting a source of material to be sputtered,
- a grid electrode defining an apertured section spaced from the first electrode,
- a third electrode for supporting the substrate in a position such that atoms sputtered from the source of material supported by the electrode will pass through the grid electrode and deposit on the substrate,
- means for applying an RF voltage across the first and grid electrodes, means independent of said means for applying an RF voltage connected to said grid electrode for biasing said grid electrode relative to said first electrode so as to minimize heat producing energy from contacting said first electrode.

2. The system defined in claim 1 wherein the third electrode is electrically connected to the grid electrode and is thereby maintained at substantially the same potential.

3. The system defined in claim 1 wherein the grid electrode is disposed above the first electrode and the third electrode is disposed above the grid electrode.

4. The system defined in claim 3 wherein the third electrode is rotatable about a generally vertical axis disposed such that upon rotation of the third electrode the substrate is disposed above the grid electrode only during a portion of its travel.

5. The RF sputtering system for depositing a thin film of material on a substrate which comprises:
- a vacuum chamber formed by a base plate, an annular feed through ring and a bell jar,
- a first electrode assembly having a vacuum tight housing connected to the feed through ring such that the interior of the housing is at atmospheric pressure and an upwardly facing electrode plate at the upper end of the housing for supporting a source of material to be sputtered.
- a grid electrode assembly supported by the first electrode assembly having an apertured section disposed above the electrode plate of the first electrode assembly, the grid electrode assembly being electrically isolated from the electrode plate, a third electrode assembly for supporting the substrate above the apertured portion of the grid electrode, the third electrode assembly being supported by the grid electrode, means for applying an RF voltage across the first and second electrodes, and means independent of said means for applying an RF voltage connected to said grid electrode for biasing said grid electrode so as to minimize heat producing energy from contacting said first electrode.

6. The system defined in claim 5 wherein:

the third electrode assembly is rotatably journaled on the grid electrode assembly for rotation about a generally vertical axis disposed such that the substrates will be moved over the apertured section of the grid electrode assembly only during a portion of its travel through a circular path.

7. The system defined in claim 6 wherein:

there are a pluarity of first electrode assemblies for supporting a pluarlity of sources of materials to be sputtered, the grid electrode assembly has an apertured section disposed above the electrode plate of each of the first electrode assemblies, and the axis of rotation of the third electrode assembly is disposed at the center of the apertured sections such that each of the substrates will be carried over each of the electrode plates of the first electrode assemblies during a portion of its travel.

8. The system defined in claim 7 further characterized by:

a shutter disk disposed between the grid electrode assembly and the third electrode assembly, the shutter disk being rotatably supported for rotation about the same axis as the third electrode assembly and having one opening therein positioned to expose only one apertured section of the grid electrode assembly at any one time.

9. The system defined in claim 7 wherein:

the third electrode assembly comprises a disk-shaped plate having gear teeth disposed around its periphery, and further characterized by a shaft journaled on the grid electrode assembly, a gear keyed to the shaft and meshing with the gear teeth on the third electrode assembly, and means for driving the shaft to rotate the third electrode assembly.

10. The system defined in claim 9 further characterized by second and third idler gears journaled on the grid electrode assembly and meshaing with the gear teeth disposed around the periphery of the disk-shaped plate.

References Cited

UNITED STATES PATENTS

| | | | |
|---|---|---|---|
| 3,410,774 | 11/1968 | Barson et al. | 204—298 |
| 3,361,659 | 1/1968 | Bertelsen | 204—298 |
| 3,347,772 | 8/1967 | Laegried | 204—298 |
| 3,267,015 | 8/1966 | Morley | 204—298 |
| 3,369,991 | 2/1968 | Davidse et al. | 204—298 |

FOREIGN PATENTS

| | | |
|---|---|---|
| 702,672 | 1/1965 | Canada. |

OTHER REFERENCES

Seeman, "Bias Sputtering," Vacuum, vol. 17, No. 3, pp. 129–137.

Davidse, "Theory and Practice of RF Sputtering," Vacuum, vol. 17, No. 3, pp. 139–145.

ROBERT K. MIHALEK, Primary Examiner

S. S. KANTER, Assistant Examiner

U.S. Cl. X.R.

204—192